Oct. 15, 1929.   C. S. JOHNSON   1,731,781

METHOD FOR PROPORTIONING TOTAL WATER IN CONCRETE

Filed Feb. 26, 1927

Inventor:
Charles S. Johnson.
Attys.

Patented Oct. 15, 1929

1,731,781

UNITED STATES PATENT OFFICE

CHARLES S. JOHNSON, OF CHAMPAIGN, ILLINOIS

METHOD FOR PROPORTIONING TOTAL WATER IN CONCRETE

Application filed February 26, 1927. Serial No. 171,341.

The invention relates generally to the art of making concrete and more particularly to an improved method for accurately proportioning the amount of total water in the mix notwithstanding variations in the amount of moisture contained in the aggregates.

It has been recognized that the strength of concrete depends largely upon the total amount of water in the mix and that the strength varies as the amount of water varies from that required for the chemical reactions with the cement. If the amount of water is just sufficient fully to react with the cement, the resulting mix gives the maximum strength, but the mix is too stiff for most practical purposes. With a lesser amount of water the strength of the concrete decreases rapidly in proportion to the amount of water while with an excess of water the strength of the concrete also decreases rapidly with increasing quantities of water so that with 100% excess water the strength of the concrete is about 20% of the maximum obtainable with no excess water. It follows that the accurate determination of the quantity of water included in the mix is highly essential to obtain concrete of uniform and predetermined strength.

It is the object of the invention to provide an improved process for obtaining the accurate control of the total water weight in a concrete mix regardless of the normal moisture content of the aggregates.

In the processes heretofore used for proportioning the aggregates and water for concrete mixtures by weight or volume satisfactory accuracy has not been obtained because of the variable voids and normal moisture content in commercial building sand and gravel. Unknown increases in normal moisture-content have caused unknown decreases in dry-aggregate content due to bulking, and vice versa. When introduced into a concrete mix with separately proportioned units of water, these unknown variations in voids and normal moisture content of the aggregate have caused unknown variations in the total water in the mix.

In the processes wherein the proportioning has been done by volumetric measurements of the sand, gravel and water, inaccuracies have resulted due to the variations in compaction in such commercial building materials. Unknown changes in compaction result from unknown changes in normal moisture content. Thus, when these aggregates and water have been measured by volume, variable quantities of total water have been introduced into the mix. These variations in total water content in concrete mixtures change the consistency of the mixed concrete, increase the placing expense due to changes in workability, cause changes in the strength of the concrete, all other factors being held constant, and may cause "honey combed" concrete.

Numerous attempts have been made to control more accurately the amount of water introduced into the mix but no process has been advanced whereby the total moisture could be predetermined satisfactorily without frequent adjustment to compensate for variations in the normal moisture content or the compaction of the aggregates. Loose dry aggregates are subject to density changes or changes in compaction by jarring or tamping, these changes depending in part upon the gradation. Moist aggregates are also subject to such changes of density or compaction. If the aggregate be submerged it is still subject to density changes or changes in compaction when jarred or tamped or allowed to stand undisturbed, these changes again depending in part upon the gradation. Thus these prior processes wherein the quantity of aggregate has been measured by volume have been unsatisfactory in that they do not provide an accurate means to determine the total quantity of water in the mix. This error has been due largely to the fact that the gradation and apparent voids of commercial aggregates vary, and that the density varies appreciably.

The specific gravity of commercial aggregates, however, is a quality that cannot be altered by handling, jarring, tamping, gradation or standing undisturbed, and tests have shown that commercial building sand and gravel coming from many separate sources are remarkably uniform in their specific gravity. I therefore utilize this quality of the aggregates and provide a process for proportioning the water in concrete mixtures in accordance with the specific gravity of the aggregates, the process consisting generally in combining water with the one aggregate until the total weight of the water and that aggregate equals a predetermined amount at a predetermined volume, then combining additional water and a second aggregate until the total weight of the water and aggregates equals a second predetermined amount at a second predetermined volume, and then draining off a predetermined weight of water.

For the purpose of illustrating more clearly the operation of my invention I have illustrated an apparatus adapted to utilize the process, but it is to be understood that the form of the apparatus used may be varied at will without departing from the spirit and scope of the invention as expressed in the claims.

Figure 1:
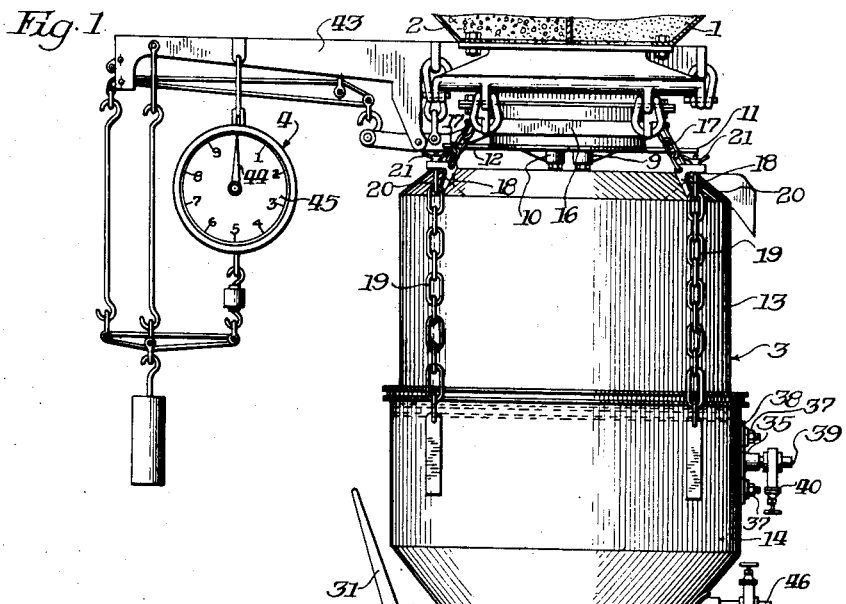
Figure 1 is an elevational view, somewhat diagrammatic in nature, of an apparatus adapted to the invention.

Referring to the drawings, the apparatus illustrated comprises a sand bin 1, a gravel bin 2, an adjustable measuring hopper 3, and a weighing mechanism having a dial 4. The bins may be supported by any suitable means (not shown) and the hopper and weighting device are herein shown as suspended from the bins. The bins have semicircular discharge openings 5 and 6 at the bottom thereof, controlled by gates 7 and 8 which are pivotally mounted on the bin at 9 and 10. The gates are operable by means by handles 11 and 12.

The measuring hopper comprises telescoping cylindrical sections 13 and 14 slidable one within the other to permit volumetric adjustment thereof. As illustrated herein the upper section 13 has an overflow spout 15 and is supported from a load supporting member 16 of the weighing device by means of a plurality of chains 17 fastened to the member 16 and to brackets 18 secured on the hopper. The lower section 14 is suspended from the upper section by means of a plurality of chains 19 which are anchored at their lower ends on the lower section. At their upper ends these chains are looped over hooked portions 20 of adjustable screw threaded devices 21 carried on the brackets 18, it being apparent that the volume of the hopper may thereby be adjusted by manipulating the screw devices 21 or by looping another link of the chains 19 over the hooks 20.

The lower section 14 is preferably provided with converging sides 22 which define a discharge port 23 at the bottom of the hopper. This port is controlled by a gate 24 which is provided with a water tight gasket 25. As illustrated herein the gate is carried on a lever 26 which is pivotally supported intermediate its ends at 27 on a bracket 28 secured rigidly to the section 14 of the hopper. The end 29 of the arm is pivoted to an outstanding lug 30 positioned centrally on the gate. To operate the gate a hand lever 31 is pivoted at 32 on the bracket 28, and a toggle link 33 is connected intermediate the adjacent ends of the lever 31 and lever 26 and a stop 34 provided on the hand lever 31 so that in the closed position of the gate as illustrated in the drawings, the gate is held locked by the toggle device.

An adjustable overflow device 35 is provided on the container 14 adjacent a vertical slot 36 therein and is secured thereto by means of headed screw devices 37. This overflow device comprises a plate 38 conforming to the contour of the container, a discharge pipe 39 extending through the plate and a valve 40. A pipe 41 secured permanently to the lower portion of the container is adapted to be connected to a suitable water supply (not shown) and has a valve 42 therein adapted to control the discharge of water through the pipe and into the hopper.

The weighing mechanism may be of any preferred form, that illustrated in the drawings comprising the scale member 16 supported from an arm 43 by means of any well known character and connected with an indicating pointer 44 on the dial 4 through suitable linkage. This mechanism is adjusted so that with the hopper empty the pointer 44 indicates zero on a scale 45 on the dial 4 which scale is calibrated in pounds.

The process when utilized in connection with this apparatus consists generally in placing a known quantity of water in the hopper of a predetermined volume; filling the hopper with normally moist sand until the combined weight of the sand and water equals a predetermined amount at the predetermined volume; adding a second quantity of water; filling the hopper with normally moist gravel until the combined weight of water, sand and gravel equals a predetermined amount at a second predetermined volume; and then draining off a predetermined quantity of water.

Assuming, for purposes of illustration that it is desired to proportion the ingredients for a concrete mix which will contain 80 pounds of water, 225 pounds of sand, 100 pounds of cement and 450 pounds of coarse aggregate, hereinafter referred to as gravel. As this process is applicable primarily to the proportioning of the water, sand and gravel, we shall consider only these ingredients, the other being proportioned by any convenient method. A simple method for calibrating the hopper to the proper volumes for these quantities of water and aggregates is as follows:

The specific gravity of the sand is first determined by any customary process. For this example we shall consider this as 2.70 for both the sand and the gravel. As the specific gravity of a substance expresses the relation of the weight of a given volume of the substance to the weight of the same volume of water, the weight of the aggregate is 2.7 times the weight of the same volume of water. Therefore by dividing the weight of the sand (225 pounds) by 2.7 the result is 83.3 which is the weight of a quantity of water equal in volume to the absolute volume of 225 pounds of sand. Therefore, by running 83.3 pounds of water into the hopper as an equivalent to the volume of 225 pounds of dry sand, and then adding a quantity of water sufficient to more than fill the voids in the sand, which quantity is herein taken as 80 pounds, the amount selected for the total water for the mix, the hopper may be set to this combined volume of 163.3 pounds of water by adjusting the lower overflow device so that the top surface of the water is level with the overflow pipe 39. The hopper is thereby set volumetrically for the proportioning of 80 pound units of water and 225 pound units of dry sand.

Similarly dividing the weight of the gravel (450 pounds) by 2.7 the result is 166.7 which is the weight of a quantity of water equal in volume to the absolute volume of 450 pounds of dry gravel. Thus by closing the valve 40 in the overflow pipe 39 and running in 166.7 pounds of water in addition, the hopper contains a volume of water equal to the absolute volumes of 80 pounds of water, 225 pounds of sand and 450 pounds of stone. However, although 80 pounds of water is generally sufficient to submerge 225 pounds of sand so as to fill the voids therein and allow the combined weight of the water and sand to be obtained at the volume determined by the overflow pipe 39, still 80 pounds of water is not sufficient to submerge 225 pounds of sand plus 450 pounds of gravel. For this reason, I preferably adjust the level of the upper overflow 15, not to the volume of 330 pounds of water, i. e., 163.3 plus 167.7, but to a volume which includes an excess quantity of water sufficient to more than fill the voids in the gravel. This excess in the present instance may be taken as 90 pounds of water. Therefore the upper overflow is set at the level of 330 plus 90 or 420 pounds of water.

Figures 2, 3:
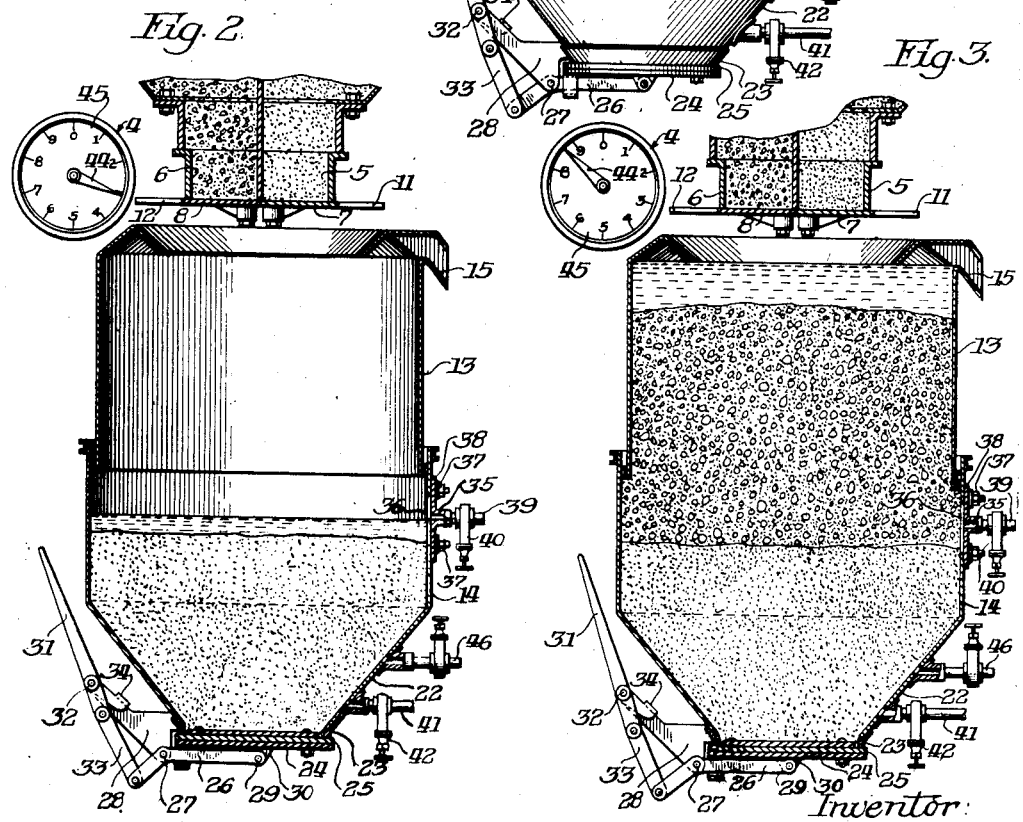
Figs. 2 and 3 are diagrammatic views illustrating two different stages in the process.

The preferred operation of the apparatus utilizing my invention is then as follows: Water is run into the hopper from the pipe line until an amount sufficient to submerge the sand is contained therein. Herein this is taken as 80 pounds, the total weight of water desired in the mix. Then sand of any degree of normal moisture content is discharged from the bin 1 into the hopper until the weight of the combined sand and water (Fig. 2) equals 80 plus 225 or 305 pounds. In this way any water which is introduced as moisture in the sand will displace an equal weight of the water initially placed in the hopper, this displaced quantity of water passing out through the overflow pipe 39, the valve 40 being left open. The valve 40 is then closed and an additional quantity of water run in sufficient to submerge the gravel. Herein 90 pounds of water is run in, the pointer 44 then indicating 395 pounds. Then gravel of any degree of normal moisture content is discharged from the bin 2 into the hopper until the weight of the combined gravel, sand and water (Fig. 3) equals 80 plus 225 plus 450 plus 90 (the weight of the excess water) or 845 pounds. In a similar way, then, any water which is introduced as moisture in the gravel will displace an equal weight of the water initially placed in the hopper, this displaced quantity of water passing out through the overflow spout 15.

It will be evident that the hopper will now contain 170 pounds of water, 225 pounds of dry-sand-content, and 450 pounds of dry-gravel-content regardless of the degree of compaction of the sand provided only that the mass of aggregate in the hopper is not great enough to absorb more than 170 pounds of water.

In practice the excess amount of water added is such that this does not occur. In the example illustrated this excess quantity was 90 pounds. This amount is then run off as by opening a suitable discharge valve 46 and discharging water from the hopper until the total weight indicated on the dial 4 has reduced from 845 to 845 minus 90, or 755 pounds.

This process is readily adapted for practical operation and lends itself easily to changes in the proportion of the ingredients when such change is desired. Thus, if it is desired to keep the water-cement ratio constant, as is now well recognized as a means to obtain concrete of uniform strength, and yet vary the amounts of sand and gravel in the mix, the dry-aggregate-content weighs may be varied without changing the total water, merely by increasing or decreasing the volume of the hopper and also the scale reading of the weighing mechanism.

Although it is preferable first to insert the desired amount of water in the hopper, it is sufficient if at least the total amount desired less the normal moisture contained in the sand, be filled in the hopper. In practice the quantity run in is usually equal to or greater than 80 pounds, it being obvious that any excess will run off as it is displaced by the dry-sand-content of the sand discharged into it. Similarly this is true in adding the water to submerge the gravel.

From the foregoing it will be apparent that by combining water, with aggregates, which are of constant specific gravity for practical purposes and therefore of uniform weight per unit volume, into resultant masses of equal weights and equal volumes, the proportions of total water and dry-aggregate-content in these resultant masses must necessarily be substantially constant and vary only as the specific gravity of the aggregates vary. Thus the process is adapted to control accurately the total water in the mix notwithstanding variations in the moisture content of the aggregates.

I claim as my invention:

1. The process for proportioning water and aggregates for a concrete mix which includes running substantially a predetermined quantity of water into a container, charging sand into the container to a predetermined total weight of sand and water at a predetermined volume, running substantially a second predetermined quantity of water into the container, charging gravel into the container to a predetermined weight of gravel, sand and water at a second predetermined volume, and discharging a predetermined quantity of water from the container.

2. The process for proportioning water and aggregates for a concrete mix which includes running substantially a predetermined quantity of water into a container, charging one aggregate into the container to a predetermined total weight of aggregate and water at a predetermined volume, running substantially a second predetermined quantity of water into the container, and charging a second aggregate into the container to a predetermined weight of aggregates and water at a second predetermined volume.

3. The process of proportioning water and aggregates for concrete which consists in combining sand containing a variable moisture content with water until their combined weight at a given combined volume equals a predetermined amount, then combining gravel containing a variable moisture content with water and said combined mass until the weight of the resultant mass at a second given volume equals a second predetermined amount.

4. The process for proportioning water and aggregates for concrete mixtures which includes combining normally moist sand and water in a ratio to give a combined weight at a predetermined combined volume and then combining normally moist gravel with said water and sand in a ratio to give a second combined weight at a second predetermined combined volume, and measuring a predetermined volume of the second combined mass for each concrete mix.

5. The process for making concrete which includes running a quantity of water into a container of predetermined volume, charging sand into the container until the weight of the combined sand and water equals a predetermined value, and then charging gravel into the container until the weight of the combined gravel, sand and water equals a predetermined value.

6. The process for proportioning aggregates and water for a concrete mix which includes running a quantity of water into a container of predetermined volume, charging one aggregate of known specific gravity into the container until the weight and volume of the combined aggregate and water equal predetermined values, charging a second aggregate of known specific gravity into the container until the weight and volume of the mass equal a second set of predetermined values, and running off a predetermined quantity of said water.

7. A process for proportioning aggregates and water for a concrete mix which includes running a quantity of water into a container of predetermined volume, submerging a quantity of one normally moist aggregate in said water, submerging a quantity of a second normally moist aggregate in said water while permitting excess water to overflow the container, and running off a predetermined quantity of the remaining water.

8. A process for proportioning aggregates and water for a concrete mix which includes running a quantity of water into a container of predetermined volume, submerging a quantity of normally moist aggregate in said water while allowing excess water to overflow the container, and running off a predetermined quantity of the remaining water.

9. A process for proportioning commercial aggregates and water for a concrete mix which includes placing a quantity of water in a container, submerging a quantity of normally moist aggregate in said water, and discharging from said container a predetermined quantity of water so as to leave the level of water in the container below the top of the aggregate.

In testimony whereof, I have hereunto affixed my signature.

CHARLES S. JOHNSON.